United States Patent [19]

Jones, Jr.

[11] 3,803,501

[45] Apr. 9, 1974

[54] FREQUENCY DISCRIMINATOR USING DIGITAL NON-RECURSIVE FILTERS

[75] Inventor: Gardner Dulany Jones, Jr., Raleigh, N.C.

[73] Assignee: International Business Machines Corporation, Armonk, N.Y.

[22] Filed: Nov. 17, 1972

[21] Appl. No.: 307,716

[52] U.S. Cl. .................... 329/104, 178/88, 325/320

[51] Int. Cl. .......................................... H04l 27/14

[58] Field of Search ...... 329/104, 110; 325/30, 320; 178/66 R, 88

[56] References Cited

UNITED STATES PATENTS

| | | | |
|---|---|---|---|
| 3,729,684 | 4/1973 | Shuda | 329/104 |
| 3,656,064 | 4/1972 | Giles et al. | 325/320 X |
| 3,729,587 | 4/1973 | McGill et al. | 325/320 X |
| 3,689,844 | 9/1972 | Buzzard et al. | 325/320 |

*Primary Examiner*—Alfred L. Brody

[57] ABSTRACT

A digital FSK discriminator in which the frequency sensitive elements are formed from a pair of non-recursive transversal filters having integer weighting coefficients. The discriminator is responsive to successive magnitude samples coded in two's complement form. Because the weighting operation can be performed in two's complement arithmetic, transversal filter elements using add and delay operations eliminate the necessity for coefficient multipliers. In the embodiment, the discriminator operating point is positioned along a linear portion of a raised cosine shaped relative magnitude-frequency characteristic and may be varied as a function of the total time delay of a shift register portion of the transversal filter element.

2 Claims, 7 Drawing Figures

FIG. 2A

Analysis of Sample Transversal Filter
Assume Zero Time Axis is in Center of Filter

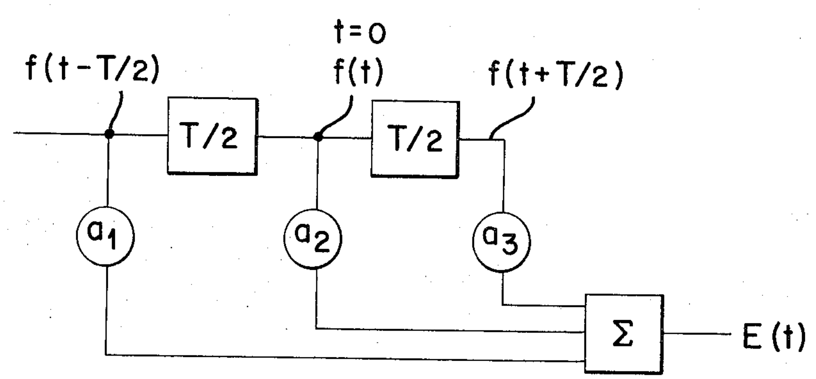

$$E(t) = a_1 f(t-T/2) + a_2 f(t) + a_3 f(t+T/2)$$

By Fourier Transformation $$E(\omega) = \left[a_1 e^{j\omega T/2} + a_2 + a_3 e^{-j\omega T/2}\right] F(\omega)$$

Transfer Function $$\frac{E(\omega)}{F(\omega)} = a_2 + a_1 e^{j\omega T/2} + a_1 e^{-j\omega T/2}$$

Let $a_1 = a_3$ $$\frac{E(\omega)}{F(\omega)} = a_2 + a_1 \left[e^{j\omega T/2} + e^{-j\omega T/2}\right]$$

But Since $\cos \omega T/2 = \frac{e^{j\omega T/2} + e^{-j\omega T/2}}{2}$ $$\frac{E(\omega)}{F(\omega)} = a_2 + 2a_1 \cos \omega T/2$$

Further Let $a_1 = 1 \quad a_2 = 2$ $$\frac{E(\omega)}{F(\omega)} = 2 + 2 \cos \omega T/2 = 2\left[1 + \cos \omega T/2\right]$$

If $a_1 = -a_2/2 = -1$

Then $\frac{E(\omega)}{F(\omega)} = 2 - 2\cos \omega T/2 = 2\left[1 - \cos \omega T/2\right]$

D = TIME DELAY/SHIFT REGISTER STAGE HOLDING ONE SAMPLE IN TWO'S COMPLEMENT

Σ = DIGITAL ADDER

FREQUENCY DISCRIMINATOR USING DIGITAL NON-RECURSIVE FILTERS

BACKGROUND OF THE INVENTION

This invention relates to frequency discriminators, and more particularly, to FSK discriminators formed from digital filters and suitable for use on a time multiplex basis.

As pointed out by Bennett and Davey in "Data Transmission", McGraw Hill Book Co., 1965, at pages 170–174, there are two general types of frequency detectors. The first are the zero axis crossing or cycle counting types which derive a base band component directly from the time rate of zero axis crossings. In the other detection method an amplitude limited signal is passed through a frequency selective network. The network introduces an amplitude variation proportional to frequency. The ideal detector would be implemented by a perfect discriminator followed by a low pass filter.

A. B. Karlson in "Communication System", McGraw Hill Book Co., 1968 at pages 386–390 states that an FSK wave form consists of constant amplitude signals having different frequencies, one frequency for each possible message symbol. In his view, FSK can be treated as two (or more) interleaved on-off signals of different carrier frequencies. In this regard, FSK can be detected using one synchronous or envelope detector for each frequency of interest. At any point in time, the detector with the largest output is then presumed to indicate the transmitted frequency. In point of fact, the conventional non-coherent detection system for binary FSK employs a pair of bandpass filter and envelope detectors the outputs of which are rectified and applied to a subtractor. The implementation of such a system using an all digital FSK discriminator is taught by C. Alan Buzzard in the IEEE Transactions on Communications Technology, Volume 18, No. 5, October, 1970 at pages 619–624.

Buzzard shows at page 621 a detailed block diagram of a recursive type digital filter implementation for an FSK discriminator. He also states in describing the hardware design at page 622 that the system hardware was designed around transistor-transistor logic digital integrated circuits. In addition, he notes that the adders, subtractors, and shift register delays are standard digital circuitry. He notes parenthetically that the coefficient multipliers necessary to his embodiment are not so straightforward and require a more detailed subsequent discussion.

At this point, let us define some terms. By the term "recursive" it is meant that the computation of an output of a filter is an explicit function of previous outputs and inputs. In contrast, by the term "non-recursive" it is understood that the output of a filter is an explicit function only of previous inputs.

With this view in mind, it is apparent that the contemporary structure of a recursive filter, in addition to the acknowledged complexities of the coefficient multipliers, introduces the prospective complexity and instability of multiple feed-back paths.

Buzzard recognized that there were several reasons for representing successive magnitude samples of the applied input frequencies by encoding them into two's complement form. First, if the sign bit were to be treated as a number bit, an addition or subtraction would automatically produce the correct sign bit. Second, when three numbers were added together by adding the first two, and then adding the third to the sum of the first two, then the correct answer could be obtained even if the intermediate sum overflowed. These properties are indeed taken advantage of in the coefficient multiplier. In substance, the use of recursive filters requires a rather accurate representation of the filter coefficient if high Q and stable center frequencies are to be achieved. Buzzard uses eight and ten bits for the coefficients and other investigators have suggested as many as 16 bits for a general purpose FSK discriminator. The requirements for long coefficient word length results in complex multipliers and long propagation times for multiplication. This is a limiting factor on the number of FSK signal sources which an FSK discriminator could service for example, on a time multiplex basis.

SUMMARY OF THE INVENTION

It is well-understood that the linear operation of the frequency discriminator requires that the operating region of interest be located on a corresponding linear portion of a relative magnitude-frequency characteristic, which characteristic defines the discriminator response. Thus, a discriminator operating point positioned midway along the extent of the forward or reverse slope of a discriminator, exhibiting a raised cosine characteristic, would satisfy the linearity requirement.

In a discriminator for detecting sinusoidal frequencies $\omega_1$ and $\omega_2$ according to the invention, the discriminator is operative along a linear portion of the relative magnitude-frequency characteristic $E(\omega)/F(\omega) = K \cos (\omega T)/2$, where $E(\omega)$ and $F(\omega)$ are the output and input frequency functions respectively; T is a null of the characteristic in addition to being the discriminator time delay in seconds; and frequency $\omega$ lies within the range $\omega_1 \leq \omega \leq \omega_2$.

The invention contemplates sampling successive magnitudes of the applied frequencies and for digitally encoding such sampled magnitudes in two's complement form, the sampling rate being at least two or more times the frequency of interest. The digitally encoded samples are applied to a non-recursive digital filter arrangement including a serial delay element of T seconds having three taps corresponding to integer weighting coefficients $a_1$, $a_2$, and $a_3$. The arrangement further includes a first and second filter coupling the tapped delay element and having respective relative magnitude-frequency characteristics of the form:

$E_1(\omega)/F(\omega) = a_1 e^{j\omega T/2} + a_2 + a_3 e^{-j\omega T/2} = 1e^{j\omega T/2} + 2 + 1e^{-j\omega T/2}$ $E_2(\omega)/F(\omega) = a_1 e^{j\omega T/2} + a_2 + a_3 e^{-j\omega T/2} = -1e^{j\omega T/2} + 2 - 1e^{-j\omega T/2}$ and means for combining the filter outputs magnitudes such that: $E(\omega)/F(\omega) = E_1(\omega)/F(\omega) - E_2(\omega)/F(\omega) = 2e^{j\psi T/2} + 2e^{-j\omega T/2} = 2[e^{j\omega T/2} + e^{-j\omega T/2}]$ From the identity $\cos \theta = [e^{j\theta} + e^{-j\theta}]/2$ Then, $e^{j\omega T/2} + e^{-j\omega T/2} = 2 \cos \omega T/2$ $E(\omega)/F(\omega) = 4 \cos \omega T/2$ Restated, the basic discriminator uses as a frequency sensitive element a three tap non-recursive filter. This basic element is manifest as two dissimilar transverse filters specified by their respective integer weighting coefficients $a_1$, $a_2$, $a_3$ as 1, 2, 1; and −1, 2, −1, respectively. When the two responses are appropriately combined they produce the cos $\omega T/2$ characteristic. The principle advantage of the transversal form of discriminator is the ease with which it can be implemented by digital circuits. In contrast with the prior art, the only multiplication of coefficients performed by the filter elements is by 2. In binary arithmetic this is just a shift left. Consequently, the only arithmetic operations required by this discriminator are shifts and add, operations which parenthetically are simple and fast in execution.

For purposes of analyzing the cosine shaped response characteristic, one may consider the FSK signals as a form of FM modulation having a center frequency $f_c$ and a frequency deviation $\Delta f$ on either side thereof. Thus, $$\omega_2 = 2\pi[f_c+\Delta f]$$

$$\omega_1 = 2\pi[f_c-\Delta f]$$

Recalling now that $E(\omega)/F(\omega) = K \cos \omega T/2 = K \cos \pi f T = K \cos \pi [f_c+\Delta f]T$, T is selected such that one of the nulls of the discriminator response occurs at $f_c$. That is, $T = (2n+1)/2f_c$ where $n = 0, 1, 2...$ The response of the discriminator is then $$E(\omega)/F(\omega) = K \cos \pi (f_c+\Delta f) (2n+1)/2f_c$$

$$= K \cos [\pi f_c(2n+1)/2f_c + \pi\Delta f(2n+1)/2f_c]$$

$$= K \sin (\pi/2) (\Delta f/f_c) [2n+1]$$

$n$ is selected to make $\Delta f/f_c$ $(2n+1)$ close to 1. This maximizes the gain of the discriminator for the particular modulation index. The fact that the characteristics of the filter are periodic with frequency causes no problem for demodulating FSK signals from telephone lines since the spectrum of such signals will fall within one period of the characteristic. For example, the spectrum will be between 570 Hz. and 2850 Hz. Using linear encoding of the input signal such as by pulse code modulation, PCM, will not produce any new base band spectrum components other than quantizing noise. If a clipped line signal is used, or if the discriminator is used for a full duplex modem, it will be necessary to employ a bandpass filter ahead of the discriminator to limit the range of its response.

In the illustrative embodiment the design of a digital discriminator may be used for the Bell System 202 and CCITT V 23 modems. In such commercial modems, the sampling frequency of the input signal is $f_s$ and the number of delay elements m are determined as follows:

$$T = (2n+1)/2f_c = m/f_S$$

$$\text{or } f_S = (2f_c m/2n+1)$$

For this application, $f_c$ equals 1700 Hz. and $n$ is 1. If the number of delay elements m is said equal to 8 then it results in a sampling frequency of $f_S$ of 9.0667 Khz.

BRIEF DESCRIPTION OF THE DRAWINGS

FIGS. 2A and 2B represent the structural and mathematical analysis of the transversal filter implementation according to the invention.

DESCRIPTION OF THE PREFERRED EMBODIMENT

Figure 1:
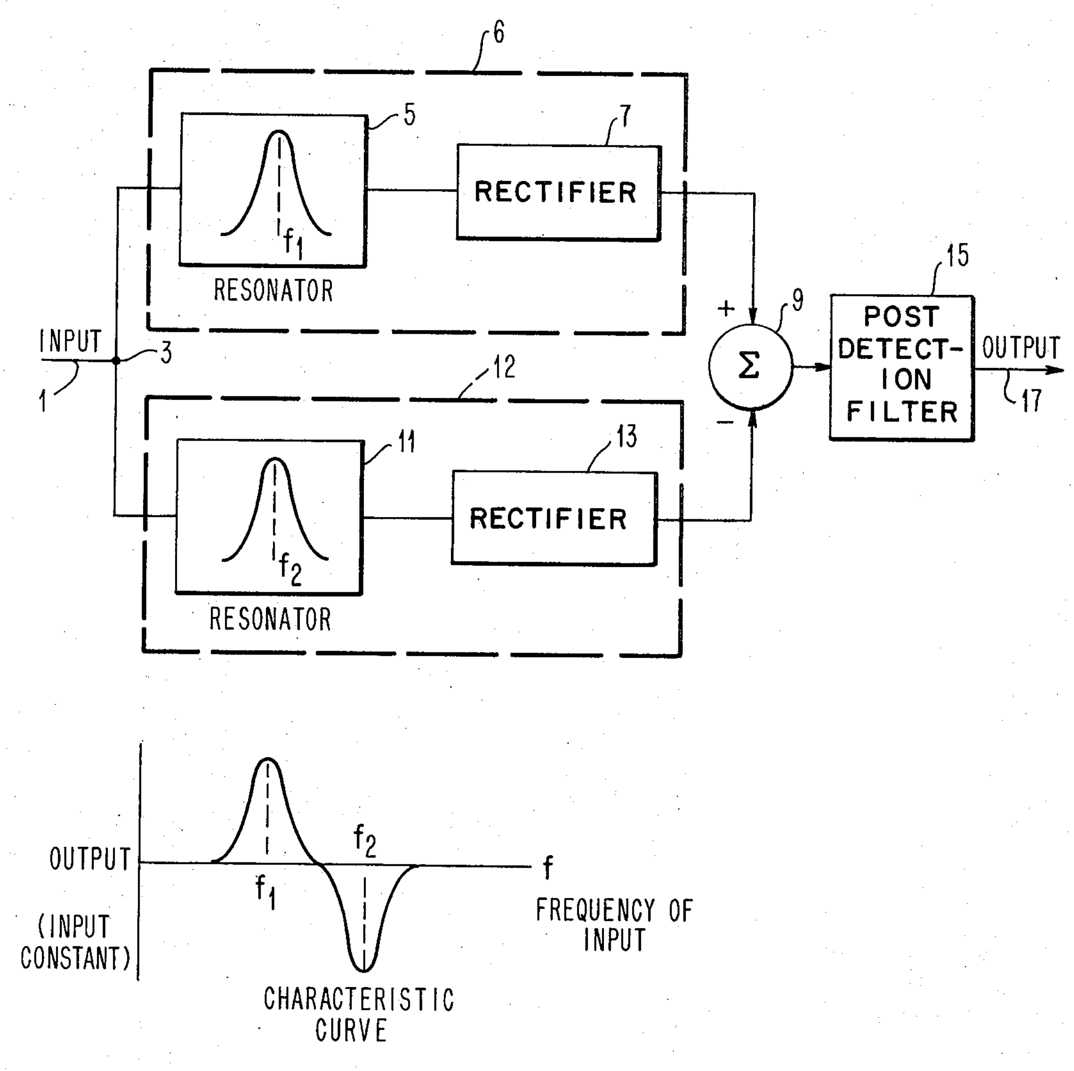
FIG. 1 PRIOR ART
FIG. 1 shows the push pull binary FSK discriminator and its characteristic curve according to the prior art.

Referring now to FIG. 1, there is shown the basic frequency discriminator for binary FSK modulation according to the prior art. The varying input frequency is applied at input 1 simultaneously to two resonators 5 and 12 which resonators are tuned to respective frequencies $\omega_1$ and $\omega_2$. If the desired frequency is present, then suitable magnitude indication is made thereof and applied to the corresponding rectifier element 7 and 13. A difference signal formed by subtractor 9 provides a positive going output if frequency $\omega_1$ has been detected and negative going output if frequency $\omega_2$ has been detected.

Figure 2B:
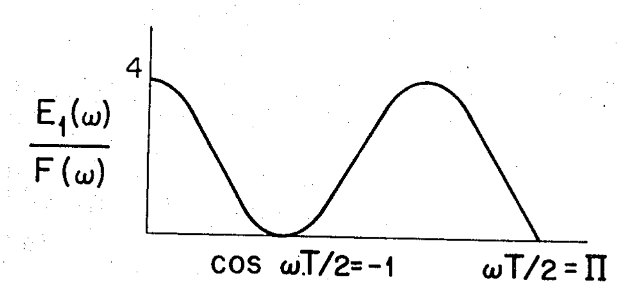
Figure 4:
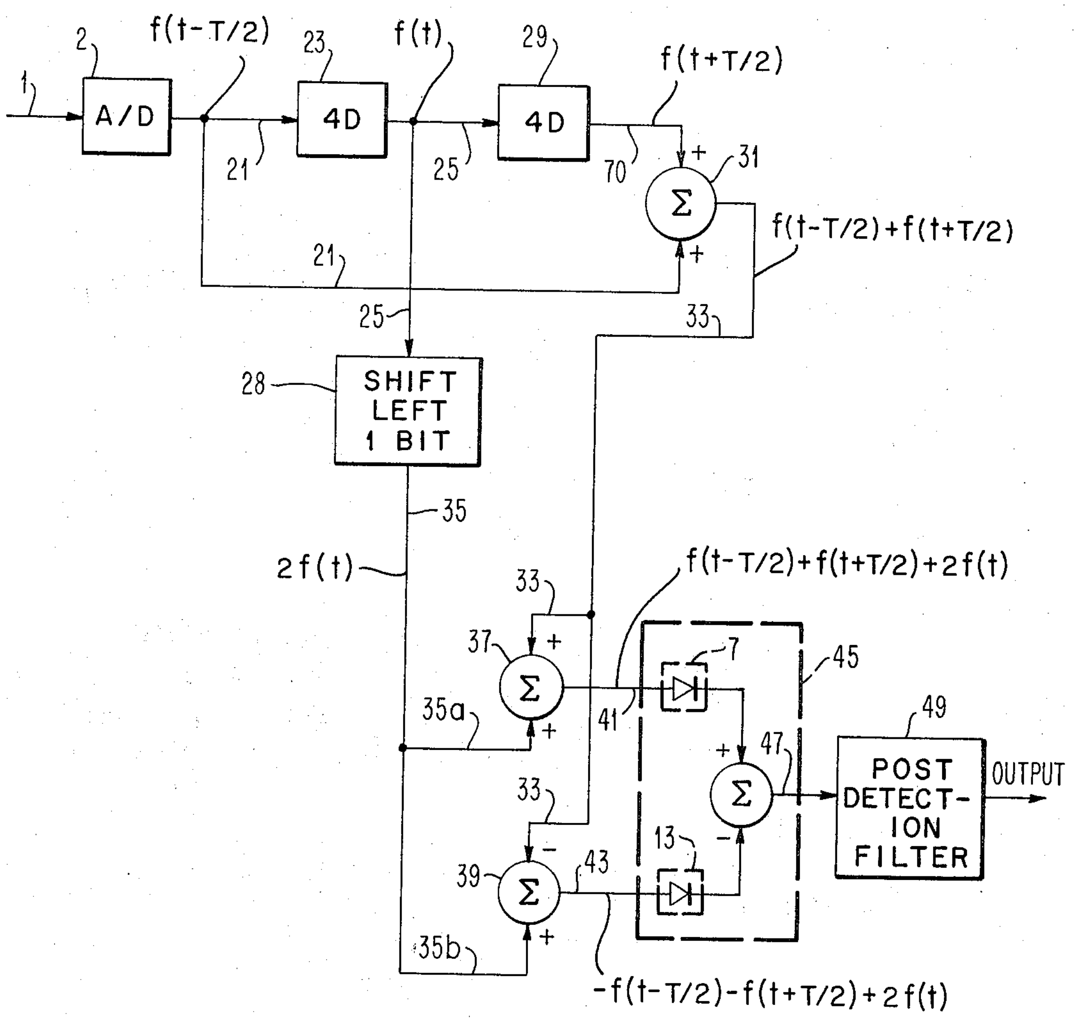
FIGS. 4 and 5 represent the general and specific logic embodiments of a single delay element fed from replacing the two delay elements shown in FIG. 3B.
Figure 5:
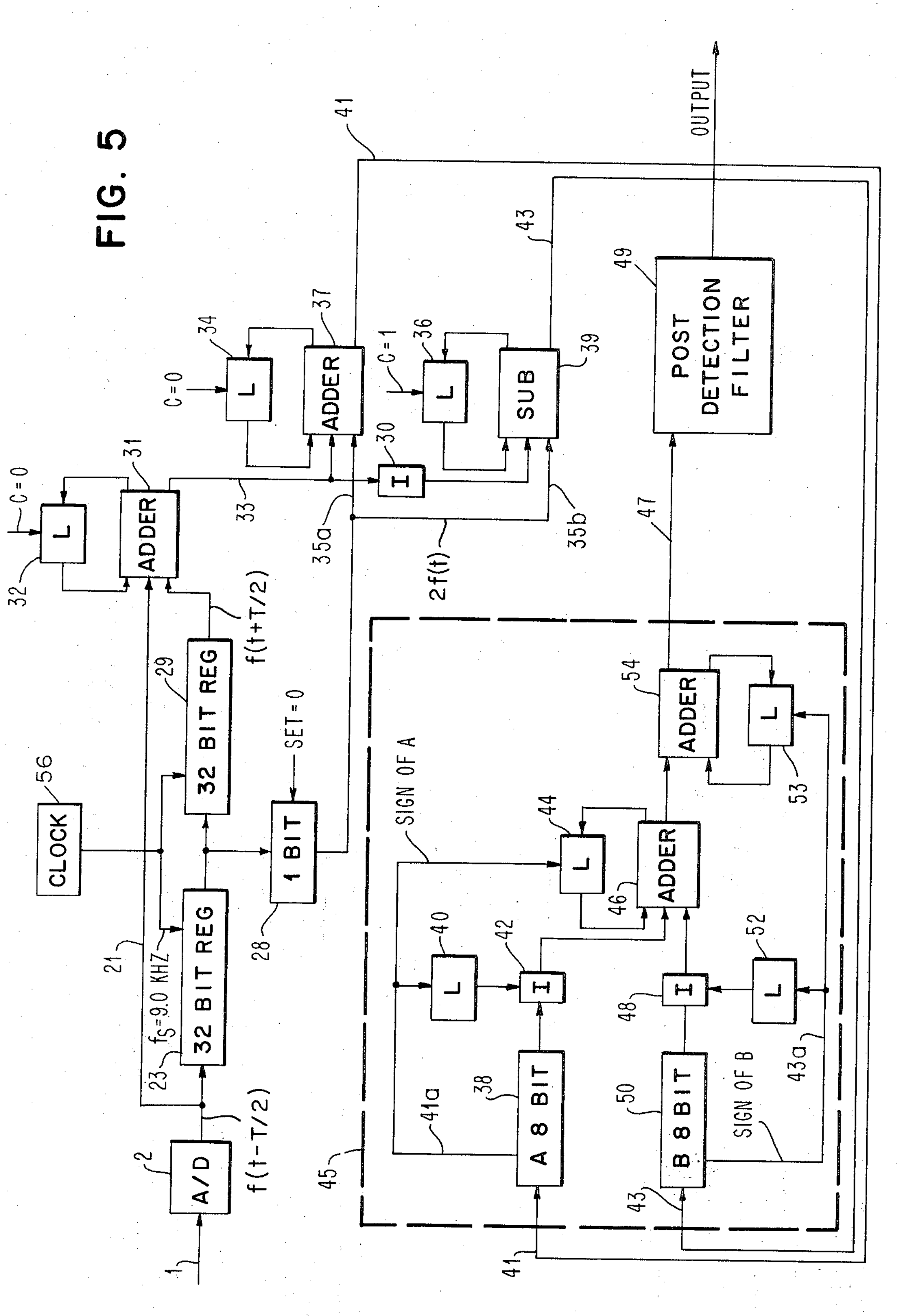

Before discussing the embodiments shown in FIGS. 4 and 5, reference should be made to FIGS. 2A and 2B in which an analysis of a simple transversal filter and its relationship to a desired raised cosine response is set forth. In FIG. 2A, a typical two section filter is shown having weighting coefficients $a_1$, $a_2$, $a_3$ appearing respectively at the input, midpoint and output of the delay element. To simplify the analysis, the point where time is equal to 0 is between the two delay elements.

In FIG. 2B, the frequency characteristics of the respective filter elements are graphically displayed. The first filter having the $a_1$, $a_2$, $a_3$ weighting of 1, 2, 1 shows a raised cosine characteristic while the other filter having the −1, 2, −1 coefficient exhibits a raised negative cosine characteristic. As an alternative representation, the cosine rather than the polar coordinate notation is used.

Figure 3A:
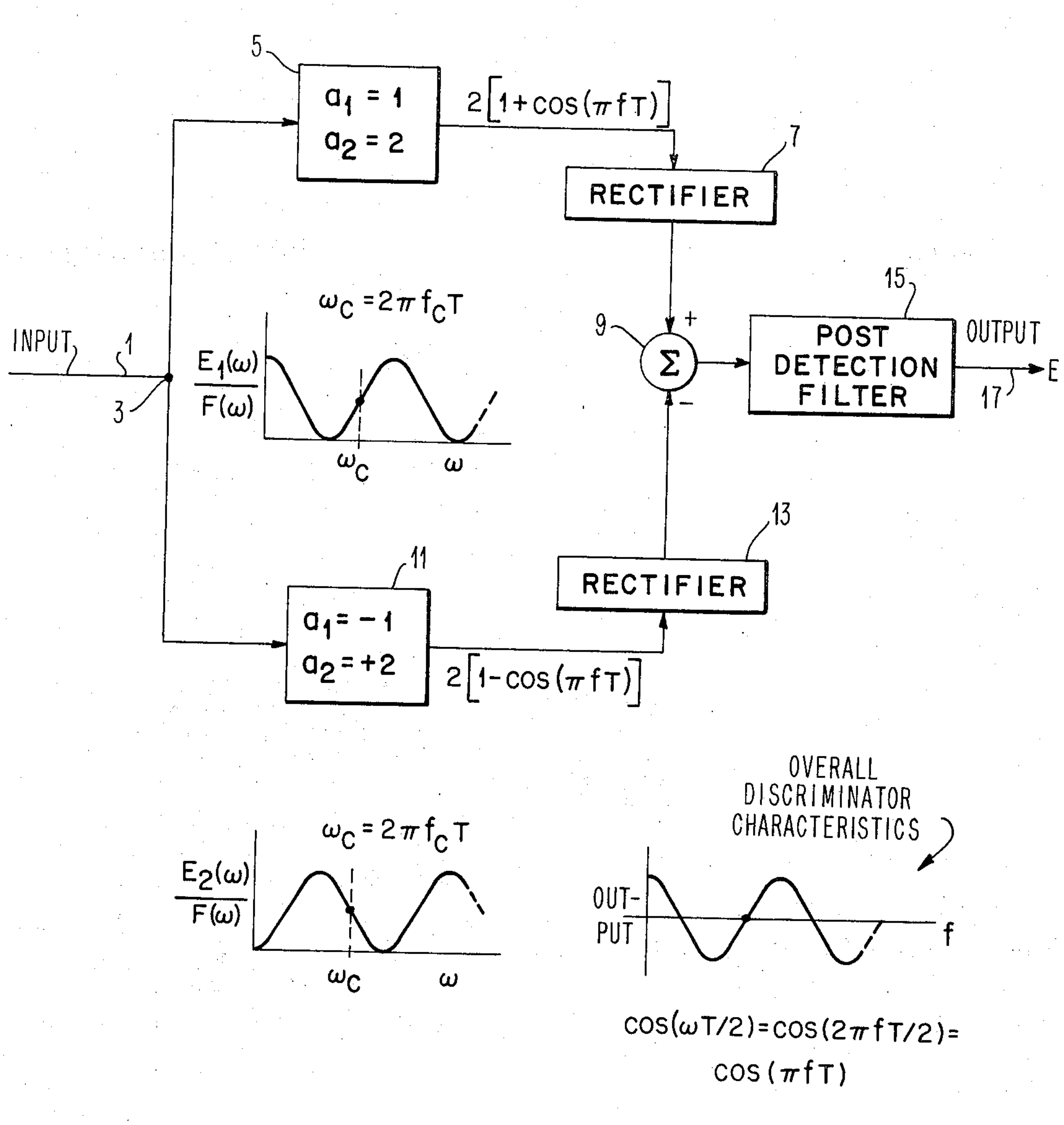
FIG. 3*a* is a block diagram representation of the inventive discriminator using, however, the nonrecursive filter with integer coefficients derived from the analysis in FIG. 2.

Referring now to FIG. 3A, it is apparent that one can substitute the transversal filter elements in their respective positions in the classic configuration shown in FIG. 1. Also depicted is the transfer function both graphically and algebraically in cosine notation for the respective filter characteristics. The classical "push pull" configuration of a filter pair in FIGS. 3A, 3B does not presuppose that FSK detection cannot be performed by a single filter such as shown in FIG. 2A which single filter possesses a raised cosine characteristic. The "push pull" configuration advantageously doubles the dynamic range because of the output subtractive element and increases the signal to noise ratio over that of the single filter form. Lastly, the raised cosine configuration requires circuitry to compare the filter output to a fixed reference in order to determine whether the output is one magnitude or the other. This adds circuit complexity. Thus, while there are reasons for preferring the "push pull" embodiment, the practical question is whether simplifications can be made in a preferred embodiment. To this extent, the logic shown generally in FIG. 4 and specially in FIG. 5 is pertinent.

Figure 3B:
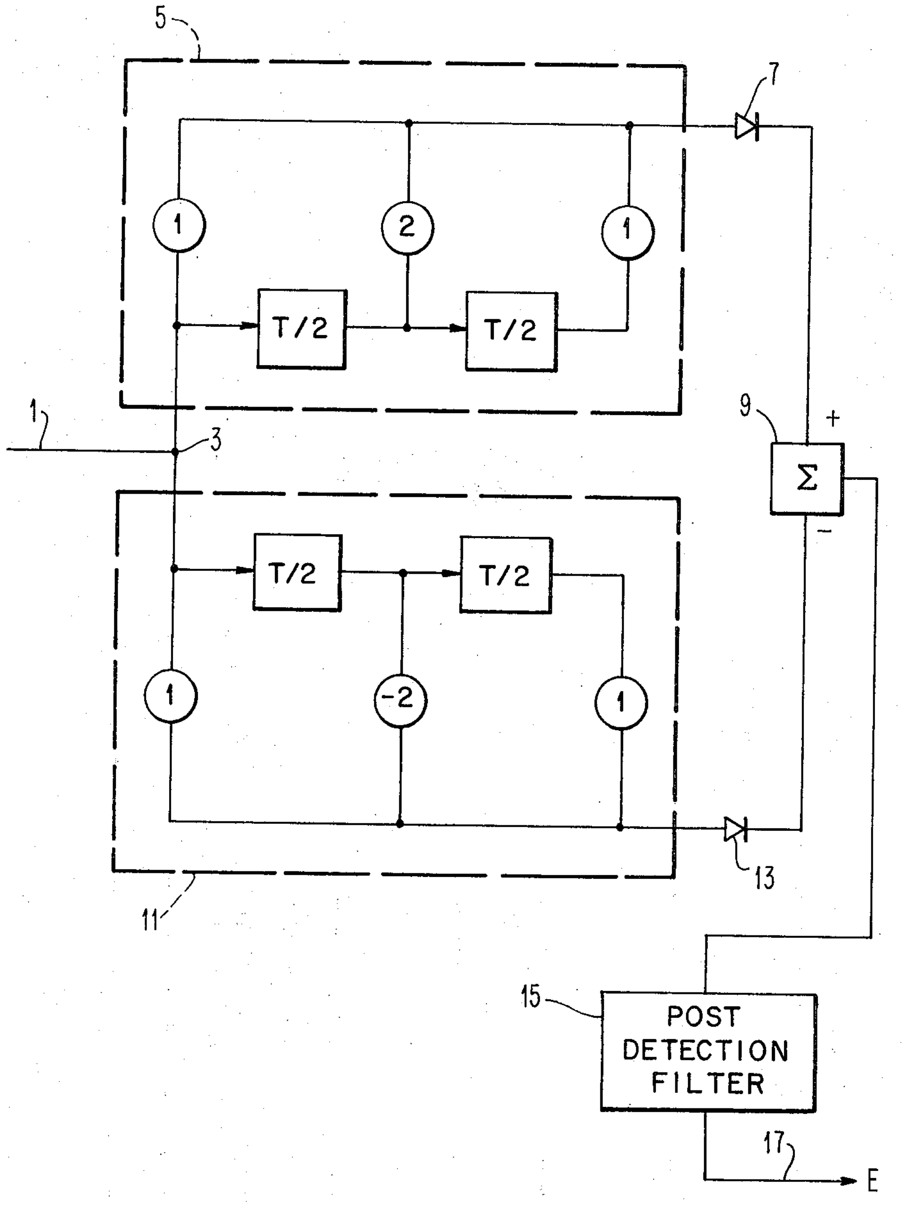
FIG. 3B depicts a two transversal filter implementation of the block diagram representation of FIG. 3A.

It should be noted in connection with FIGS. 3B that elements 5 and 11 are transversal filters. Each filter includes a two-section delay element of T/2 seconds apiece, coefficient multipliers (1, 2, 1; or 1, −2, 1) coupled to taps, and a corresponding rectification element (7, 13) terminating in a common caparator (9). Recalling from FIG. 3A that the center frequency $\omega_c$ for each filter determines an operating point on a linear portion of its raised cosine characteristic, i.e., $2[1\pm\cos\pi f l]$. It is evident that the combined discriminator characteristic will be of the form $\cos \pi fT$ whose operating point will likewise lie in a linear region of the combined characteristic.

To go from the FIG. 3B to the FIG. 4 embodiment requires that one recognize that both filters 5 and 11 have a delay element of the same design. The design object then is to use a single delay line but retain the "push pull" signal processing. Care must be taken to preserve the functional equivalence of coefficient multiplication. In the digital emulation of this process, it is necessary to sample the magnitude of an incoming carrier at high speed and convert each magnitude sample into a digital number whose format simplifies coefficient multiplication. Another consideration of the prospective design is to capatilize on the fact that two of the three coefficients in each filter of FIG. 3B are the same (1, 2, 1; 1, −2, 1).

From the foregoing discussion, the following rules obtain. First, the sample magnitudes should be converted into two's complement binary form. Second, the joint processing of the first and third coefficients ($a_1$ and $a_3$) can be executed separately from the processing of the second coefficient ($a_2$). Third, the "push pull" two filter relationship can be preserved by the appropriate algebraic summation of the processed coefficients (adders 37, 39).

Referring now to FIG. 4, there is shown a first level logic block diagram of the illustrative embodiment. It is assumed that the discriminator is responsive to FSK signals where n is equal to 1 and $f_c$ is equal to 1700 Hz. Each FSK waveform is sampled at a frequency $f_S = 8/D$, where D is the perstage delay. In FIG. 4, analog to digital converter 2 samples the successive signal magnitudes applied at the input 1 and encodes them in two's complement arithmetic. The principles for the design of such sampling and code conversion system may, for example, be found in Montgomery Phister, "Logical Design of Digital Computers", John Wiley & Sons, New York, 1958, pages 229–234, 339–401 and 279–281. By applying successive samples coded into two's complement arithmetic serial multiplication is simplified. It should be possible within the principles of this invention to use a sign magnitude arithmetic if in some application parallel computation were to be used.

The output of the A/D converter 2 is in the form of an eight bit two's complement encoded word having the following format:

| Bit position | 8 | 7 | 6 | 5 | 4 | 3 | 2 | 1 | 0 |
|---|---|---|---|---|---|---|---|---|---|
| Data | MSB | | | | | | | LSB | RESET |

Delay elements formed from shift registers 23 and 29 are responsive to the successive position encoding of the data word. Prior to the receipt of the next data word a reset signal embedded between successive words returns all of the individual registers to the same condition. In consideration of the data flow in FIG. 4, it is observed that the weighting coefficients corresponding to $a_1$, $a_2$, $a_3$ are respectively effected at lines 21, 35, and 70. Adder 31 combines the signals $f(t-I/2)$ and $f(t+T/2)$ while the signal $f(t)$ is multiplied by 2 through a one bit left shift operation at circuit 27. The output of adder 31 and left shift 27 are simultaneously applied to an algebraic adder 37 and an algebraic subtractor 39. In turn, these outputs are simultaneously applied to circuit 45 which produces an output response on path 47 which is the difference in the magnitudes of the signals on 41 and 43. This is, in turn, applied to a post detection filter 49.

Referring now to FIG. 5, there is shown a detailed logical implementation of the structure of FIG. 4. In this embodiment, 32 bit registers form the delay elements 23 and 29 respectively. Five full serial combining networks such as adders of subtractors are also used. Preferably, each combining network can be considered a form of serial adder having the ability to preset the carry value at the start of each data word during the reset portion thereof. It should be assumed that the data word is simultaneously applied over parallel paths 21 serially by bit to adder 31 and to the input of register 23. The output of that register is, in turn, serially shifted to register 29 and to the shift left circuit 28. As was previously mentioned, the signal $f(t)$ must be multiplied by 2. This is accomplished by a serial left shift by one bit position. Since each data word is transmitted from stage to stage, least significant bit first, then the left shift can be accommodated by inserting a 0 in the least significant bit position and transmitting the contents of the next occurring seven bit positions. This can be instrumented by a one bit delay which the 0 is inserted schematically shown as element 28. The shifted output is applied to combining networks 37 and 39 via paths 35*a* and 35*b* respectively. Combining network 37 is a true serial adder while combining network 39 must perform a serial subtraction. This is, in part, secured by having the carry 36 reset equal to 1 and the insertion of inverter 30 on path 33. The interior design of these networks may be executed by reference to R. K. Richards' classical work entitled "Arithmetic Operations in Digital Computers", D. VanNostrand Co., New York., 1955, pages 81–135 and his more recent work entitled "Digital Design", Wiley-Interscience, New York, 1971, pages 280–294.

The output of serial adder 31 is applied least significant bit first to path 33 and simultaneously to adder 37 and the subtractor 39. Adder 37 in turn, adds serially by bit this input to the output of left shift circuit 28 applied to it over path 35*a*. Similarly, the output of the left shifter 28 is subtracted from the output of adder 31 in full subtractor 39. The results of these operations respectively are applied to paths 41 and 43. Circuit 45 provides a signal on path 47 proportional to the difference in the absolute magnitudes of the signals applied on path 41 and 43 respectively.

For purposes of further serial processing, sign information is located eight bits back in time so that it is desirable to first store the numeric information in serial registers 38 and 50. Circuit 45 consists of two adders 46 and 54. By setting the appropriate carry 53, then adder 54 becomes converted to a subtractor.

The rules of action for subtractor 45 require that if the sign of the numbers stored in register 38 is negative, then latch 40 is operated to actuate inverter 42 which inverter one's complements the eight bit contents of register 38 as they are shifted into adder 46. At the same time, carry 44 is set to one. If the sign of the number is positive, then inverter 42 is not actuated and carry 44 is set to zero.

If the sign of the number stored in register 50 is positive, then inverter 48 is actuated through latch 52. At the same time carry 53 of adder 54 is set to 1. The actuation of inverter 48 serves to one's complement the eight bits stored in register 50 as they are sequenced out and applied to adder 46. Lastly, if the sign of the number is negative, then inverter 48 is not actuated with carry 53 being set to zero.

These rules of action and logic should provide the necessary signal indication on path 47 as applied to post detection filter 49.

While the invention has been particularly shown and described with reference to a preferred embodiment thereof, it will be understood by those skilled in the art that various changes in form and details may be made therein without departing from the spirit and scope of the invention.

Figure 2B:
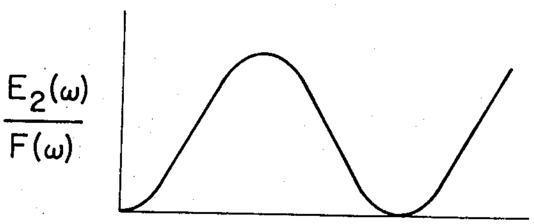

What is claimed is:

1. In a discriminator for detecting sinusoidal frequencies $\omega_1$ and $\omega_2$, the discriminator being operative along a linear portion of a relative magnitude-frequency characteristic $E(\omega)/F(\omega) = K \cos (\omega T/2)$, $E(\omega)$ and $F(\omega)$ being the output and input frequency functions respectively, T being both the discriminator time delay and a null of the characteristic, and $\omega$ lying within the range $\omega_1 \leq \omega \leq \omega_2$, the combination comprising:

means (FIG. 4–2; FIG. 5–2, 56) for sampling successive magnitudes of the applied frequencies and for digitally encoding such sampled magnitudes in two's complement form;

a T second multitap delay element (23, 29) to which said digitally encoded samples are applied;

first filter means (21, 70, 31, 33, 25, 28, 35, 35*a*, 37, 41) including the sampling means and the delay element for forming the relative magnitude-frequency characteristic:

$$E_1(\omega)/F(\omega) = a_1 e_+^{j} \omega^{T/2}) + a_2 + a_3 e^{-j} \omega^{T/2} = 1e^{j} \omega^{T/2} + 2 + 1e^{-j} \omega^{T/2},$$

$a_1$, $a_2$, and $a_3$ being coefficients;

second filter means (21, 70, 31, 33, 25, 28, 35, 35*b*, 39, 43) also including the sampling means and the delay element for forming another relative magnitude-frequency characteristic $$E_2(\omega)/F(\omega) = - a_1 3_+^{j} \omega^{T/2} + a_2 - a_3 e^{-j} \omega^{T/2} = - le_+^{j} \omega^{T/2} + 2 - l3^{-j} \omega^{T/2};$$ and means (45) for forming a combined characteristic such that $$E(\omega)/F(\omega) = E_1(\omega)/F(\omega) - E_2(\omega)/F(\omega) = K \cos (\omega T/2).$$

2. In a discriminator for detecting sinusoidal frequencies $\omega_1$ and $\omega_2$, the discriminator being operative along a linear portion of a relative magnitude-frequency characteristic $E(\omega)/F(\omega) = K \cos \omega T/2$, $E(\omega)$ and $F(\omega)$ being the output and input frequency functions respectively, T being both the discriminator time delay and a null of the characteristic, and $\omega$ lying within the range $\omega_1 \leq \omega \leq \omega_2$, the combination comprising:

shift register means (23, 29) of delay T;

means (FIG. 4–2; FIG. 5–2, 56) for sampling successive magnitudes of the applied frequencies and for digitally encoding such sampled magnitudes in two's complement form and for serially applying the encoded samples to the shift register means;

first means (21, 70, 31, 33) for forming a signal $f(t-T/2) + f(t+T/2)$ from the shift register input (21) and output (70), f(t) being a generalized function of time;

second means (25, 28, 35) for forming a signal $2f(t)$ from the shift register stage (23) located T/2 delay units from the register input;

third means (33, 35*a*, 37, 41) for algebraically combining the outputs from the first and second means to yield $+f(t-T/2)+2f(t)+f(t+T/2)$;

fourth means (33, 35*b*, 39, 43) for algebraically combining the outputs from the first and second means to yield $-f(t-T/2)+2f(t)-f(t-I/2)$; and fifth means (45) for algebraically combining the outputs from the third and fourth means such that $f(t-T/2) + 2f(t) + f(t+T/2) + f(t-T/2) - 2f(t) + f(t+T/2) = 2f(t-T/2) + 2f(t+T/2)$, the Fourier Transform of which $$E(\omega)/F(\omega) = 2e_+^{j} \omega^{T/2} + 2e^{-j} \omega^{T/2} = 4[(e^{j} \omega^{T/2} + e^{-j} \omega^{T/2})/2] = K \cos \omega T/2.$$

* * * * *

PO-1050
(5/69)

UNITED STATES PATENT OFFICE
CERTIFICATE OF CORRECTION

Patent No. 3,803,501 Dated April 9, 1974

Inventor(s) Gardner Dulany Jones, Jr.

It is certified that error appears in the above-identified patent and that said Letters Patent are hereby corrected as shown below:

In col. 2, delete lines 52-61 and substitute therefor

--$E_1(\omega)/F(\omega)=a_1e^{+j\omega T/2}+a_2+a_3e^{-j\omega T/2}=1e^{+j\omega T/2}+2+1e^{-j\omega T/2}$ $E_2(\omega)/F(\omega)=a_1e^{j\omega T/2}+a_2+a_3e^{-j\omega T/2}=-1e^{+j\omega T/2}+2-1e^{-j\omega T/2}$ and means for combining the filter outputs magnitudes such that:

$E(\omega)/F(\omega)=E_1(\omega)/F(\omega)-E_2(\omega)/F(\omega)=2e^{+j\omega T/2}+2e^{-j\omega T/2}$ $=2[e^{+j\omega T/2}+e^{-j\omega T/2}]$ from the identity $\cos\theta$ $=[e^{j\theta}+e^{-j\theta}]/2$ then, $e^{+j\omega T/2}+e^{-j\omega T/2}=2\cos\omega T/2$ $\therefore$ $E(\omega)/F(\omega)=4\cos\omega T/2$ --.

In col. 4, line 67, that portion of the formula reading "fI]" should read --fT]--.

In col 7, delete lines 33-34 and substitute therefor

--$E_1(\omega)/F(\omega)=a_1e^{+j\omega T/2}+a_2+a_3e^{-j\omega T/2}=1e^{+j\omega T/2}+2+1e^{-j\omega T/2}$,--;

delete lines 40-41 and substitute therefor

--$E_2(\omega)/F(\omega)=-a_1e^{+j\omega T/2}+a_2-a_3e^{-j\omega T/2}=-1e^{+j\omega T/2}+2-1e^{-j\omega T/2}$; and--.

In col. 8, line 34, that portion of the formula reading "I/2" should read --T/2--;

delete lines 40-41 and substitute therefor

--$E(\omega)/F(\omega)=2e^{+j\omega T/2}+2e^{-j\omega T/2}=4[e^{+j\omega T/2}+e^{-j\omega T/2}]/2=K\cos\omega T/2$.--.

Signed and sealed this 29th day of October 1974.

(SEAL)
Attest:

McCOY M. GIBSON JR.
Attesting Officer

C. MARSHALL DANN
Commissioner of Patents